(12) United States Patent
Kennaley

(10) Patent No.: US 8,572,552 B2
(45) Date of Patent: Oct. 29, 2013

(54) SYSTEM AND METHOD FOR PROVIDING EXPERT ADVICE ON SOFTWARE DEVELOPMENT PRACTICES

(75) Inventor: Mark Kennaley, Peterborough (CA)

(73) Assignee: Fourth Medium Consulting Inc., West Vancouver, B.C. (CA)

( * ) Notice: Subject to any disclaimer, the term of this patent is extended or adjusted under 35 U.S.C. 154(b) by 190 days.

(21) Appl. No.: 13/153,431

(22) Filed: Jun. 5, 2011

(65) Prior Publication Data
US 2012/0311519 A1 Dec. 6, 2012

(51) Int. Cl.
*G06F 9/44* (2006.01)

(52) U.S. Cl.
USPC .......................................... 717/104

(58) Field of Classification Search
USPC .......................................... 717/104; 705/7.22
See application file for complete search history.

(56) References Cited

U.S. PATENT DOCUMENTS

| | | | | |
|---|---|---|---|---|
| 4,975,865 | A * | 12/1990 | Carrette et al. ................ | 700/10 |
| 2008/0097734 | A1 * | 4/2008 | Raffo ................................ | 703/6 |

OTHER PUBLICATIONS

Raffo et al., "Software process simulation to achieve higher CMM levels", 1999, The Journal of Systems and Software 46, pp. 163-172.*

Martin et al., "A Model of the Software Development Process Using Both Continuous and Discrete Models", 2000, Software Process Improvement and Practice, pp. 147-157.*

* cited by examiner

*Primary Examiner* — Wei Zhen
*Assistant Examiner* — Lanny Ung

(57) ABSTRACT

A software development practices expert system and method is described. The expert system utilizes control systems engineering designs, as well as dynamic systems models to inform and guide the selection, assembly, composition, publishing and presentation, enactment, assessment, learning and analysis, refactoring, improvement and simulation of software development practices into approaches or methods to software development. The expert system collects software endeavor result data to correlate efficacy of software development practice usage, and to recalibrate dynamic systems models and control systems engineering design parameters. Such designs and models configure and improve an inference-based rule engine to provide advice to users contained within a rule repository and knowledge base.

18 Claims, 4 Drawing Sheets

Computing environment of a Software Development Practices Efficacy Expert System FIG. 1 Computing environment of a Software Development Practices Efficacy Expert System FIG. 2 Components of a Software Development Practices Efficacy Expert System

SYSTEM AND METHOD FOR PROVIDING EXPERT ADVICE ON SOFTWARE DEVELOPMENT PRACTICES

TECHNICAL FIELD

The present invention relates to the field of software and software-system development, specifically the approach/method used for analyzing, designing, programming, testing, deploying and managing the development of a software application.

BACKGROUND

The development of software applications has historically yielded poor results related to customer's expectations for cost, time-to-market or quality of the delivered product. To improve perceived and actual success rates related to software development, it would be advantageous to employ software development method/approach analysis and construction strategies which address the fundamental complexity of selecting and deploying the optimal software development practice(s) and associated knowledge base at the correct time during a software development endeavor. Furthermore, it would be advantageous to automate the knowledge of how to make such a software development practice selection or set of selections using an expert system made widely available across the interne or similar computer network to dramatically lower the cost of software development project/endeavor improvement industry-wide.

A knowledge base contains encoded knowledge. In a rule-based expert system, the knowledge base typically incorporates definitions of facts and rules along with control information. An inference engine (sometimes referred to as a rule interpreter or rule engine) provides a reasoning mechanism in an expert system. In a rule based expert system, the inference engine typically implements forward chaining and backward chaining strategies. Forward chaining is a process of applying a set of previously determined rules to the facts in a knowledge base to see if any of them fire and thereby generate new facts. In essence, all derivable knowledge is derived in forward chaining. Backward chaining is goal-driven and used to process some queries against the knowledge base. A query is considered a goal and the knowledge base is searched for facts supporting that goal. Inference engines designed for expert systems are increasingly used in business automation.

A software development approach, also synonymous in industry with "method", can be specified, described and documented using a set of practices as the components or "chunks". A practice can be defined simply as the codified knowledge of a technique or set of techniques that together have proven effective in prior usage. Common industry approaches to software development include Lean, Agile, Lean-Agile, XP (eXtreme Programming), Scrum, DSDM (Dynamic Systems Development Method), RUP (Rational Unified Process), Unified Process, Agile-Unified Process, Kanban and the like.

A common aspect of each of these approaches to software development is that they can be decomposed into practices, each describing some experience on effective software development technique based on the context by which they emerged. Usage of these practices, whether considered individually or as part of a broader method or practice-set exhibit effectiveness in certain software development projects/endeavors and not in others. The context for such effectiveness serves as a basis for categorizing the appropriateness of the choices made to apply practices/sets of practices with typical categories being size, geographical distribution, domain/problem type and complexity, technical complexity, enterprise specialization, compliance/regulatory requirements, contractual constraints and requirements, criticality and loss-of funds or lives, time-to-market and corporate culture. While retroactive categorizing of the appropriateness of practices to context has been studied and documented in some instances, proactive determination of appropriateness and risk associated with combinations of practices has been historically complex, fragmented and limited in industry. Complicating this further is the historical norm to consider and categorize appropriateness of pre-defined sets of practices labeled as named or branded container methods for such evidence and not practices on their own.

The field of Situational Method Engineering has for some time struggled with the capabilities of how to select, assemble, compose, publish and present and enact methods based on the specific situation or set of contextual factors in which a software development endeavor exists. However, an underlying sound and credible basis for the aforementioned capabilities has eluded industry. Similarly, a sound and credible basis for correlating evidence of effectiveness to practice usage has suffered from a lack of an underlying model that enables the assessment, learning, refactoring, improvement, simulation and enactment of methods such that the performance and the risks that can be expected from such practice choices made on a software development project can be understood.

One common practice that has shown consistent performance correlation on software development projects is iteration or "iterative development". While the software development industry generally agrees on the efficacy of this practice, what is not intuitive is the rationale. Specifically, what parameters applied to this practice make it effective and which do not, independent of the various synonyms given to essentially the same practice. What is non-obvious is that the central reason for such success can be modeled and explained as representing negative feedback within a closed-loop system configuration commonly leveraged in the field of Control Systems Engineering for influencing physical world dynamic system response problems.

Control Systems Engineering refers to a sub-field of General Systems Theory and is the engineering discipline that applies control theory to design systems with predictable behaviors. Control Theory is an interdisciplinary branch of engineering and mathematics that deals with the behavior of dynamical systems. Designs of system configurations within this field include but are not limited to Proportional-Integral-Derivative Control designs, Adaptive Control designs, Cascade Control designs, Optimal Control designs, Non-Linear Control designs and Stochastic Control designs.

Common study and design of the aforementioned system configurations is performed using Dynamic Systems modeling. Dynamic Systems models refer to time or frequency domain models of Single-Input-Single-Output (SISO) and Multiple-Input-Multiple-Output (MIMO) systems which includes but are not limited to Differential Equations, Laplace Transform or Fourier Transform representations, Transfer Function representation, Bode Analysis, Root Locus analysis, Nyquist Plots, Nichols Analysis, Pole placement analysis, and State-Space matrices.

Feedback within a closed-loop system provides customers and managers the ability to adjust course so as to achieve expected results and feedback has been studied and modeled extensively in the Control Systems Engineering field. It is to be recognized by the skilled artisan that all software development practices can be mapped onto such a model, with each practice concretely implementing one or more of a set of universally present generic practices that map to components that make up such system configurations. In other words, all software development practice knowledge can be reduced to a set of finite universal practices, which when specialized using concrete specific practices in various permutations and combinations covers all known software development methods. By combining practices together using control Systems Engineering designs, the resultant socio-technical system can be further modeled to explain practice choice implications. Such an observation also makes implementing an automated expert system feasible. It is non-obvious that practice advice and guidance can be achieved by leveraging Control Systems Engineering system designs and related bodies of knowledge. Such a design/set of designs provides a credible basis for providing advice on the composition, assessment, learning, improvement and simulation of software development approaches made up of practice building blocks.

In U.S. Pat. No. 20080097734 to David M. Raffo. for SYSTEM AND METHOD FOR SIMULATING GLOBAL PRODUCT DEVELOPMENT (hereinafter Raffo), a methodology, computer program and system is disclosed which relates to the simulation of global software development projects using a plurality of System Dynamics/Discrete Event models. The usage of models are further calibrated and improved by project result data as provided through the disclosed computer system program. In Raffo, what is claimed is specific usage of system dynamics/discrete event models in the embodiment described therein. However, such modeling approaches differ from Dynamic Systems modeling as commonly utilized within the field of Control Systems Engineering, generally seen as the ancestor to the modeling approaches used in Raffo. System Dynamics and Discrete Event models, while typically used for the simulation of systems and their dynamic responses, including socio-technical systems as described in Raffo through reference to Global Software Development projects, are time-domain models only and are more complex, containing a large number of model elements that suffer from intractability to common software development practitioners for the purposes of visualization and learning. Moreover, models used in the method and system of Raffo do not lend themselves to construction of a system of practices leveraging what is known from the Control Systems Engineering field.

BRIEF SUMMARY OF THE INVENTION

Embodiments of the present invention address deficiencies of the art in respect to defining, selecting and learning about software development approaches and usage results and provide a novel and non-obvious model, expert system and computer program product for utilizing Dynamic Systems models and Control Systems Engineering design based knowledge and experience.

In an embodiment of the invention, a data processing system configured to provide advice can include a process management tool enabled to integrate and contain software development practice knowledge structured using the Dynamic Systems models and Control Systems Engineering designs. The data processing system can also include a data store of rules that determine the appropriate contextual usage of practices based on contextual factors of size, geographical distribution, domain complexity, technical complexity, enterprise specialization, compliance requirements, contractual requirements, criticality, time-to-market pressures and corporate culture and the associated rule thresholds of the aforementioned for determining said appropriateness. The data processing system also can include a data store of practice choices and computed risks linked to knowledge base practices, results of their application on software development projects and changes to practice selections during software development projects. Finally, the data processing system can include Dynamic Systems model based computational logic.

The Dynamic Systems models based computational logic for the Control Systems Engineering designs can be enabled to compute the expected dynamic response time, settling time, rise time, integral of the absolute value of error, damping ratio, gain margin, the phase margin for the selected practice choices based on the effect of the practice choices on the closed-loop transfer function of the configured system of practices. These computations can trigger rules within the expert system such that advice can be given as to the expected efficacy of these practice choices, effects of choices on system stability and similar control systems engineering issues.

In another embodiment of the invention, the Dynamic Systems models and Control Systems Engineering designs can advise what the expected effects of practice selection have on the overall socio-technical system. In particular, selection of software architectural practices like asset-based development, Commercial off-the-shelf (COTS) reuse and cloud-based or service-oriented architecture strategies implement derivative control action within a feed-forward PID control system design thereby accelerating potential response time towards a reference set-point (software requirements) by the placement of a pair of zeros in the left-half-plane of the s-plane or complex plane for a transfer function computed using Laplace Transforms of model differential equations. Effects of such choices can provide simulations to facilitate exploratory learning, result correlation for future delivered advice and industry knowledge integration.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method and expert system for providing advice on the efficacy of software development practices used on software development endeavors. In one implementation, the expert system includes Dynamic Systems models and Control System Engineering designs which facilitate the composition of practice based approaches to software development, facilitates providing credible advice related to expected performance results and practice selection risks, and facilitates providing expected performance result simulations. The expert system includes a rule engine which identifies risks based on the combination of practice choices and contextual factors and is re-calibrated through the storage of practice-set selections and correlated results.

The description presents an exemplary application of this method in a computing environment utilizing a database, network connections, and processing computers, although in alternate implementations, different computing environments or connections may be used. Additionally, while the method described herein is done with particular emphasis on software development practices, the technology is applicable to other types of project or endeavor such as construction projects or any project or endeavor with inherent uncertainty in requirements.

Figure 1:
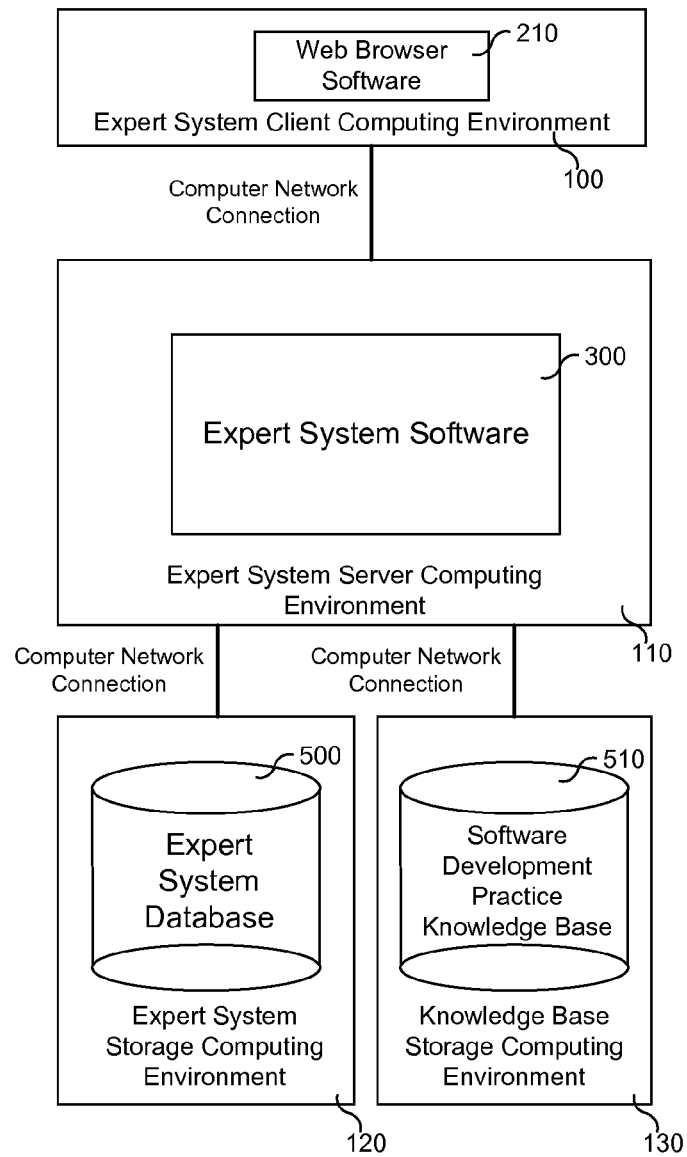
FIG. 1 illustrates one possible computing environment configuration for running the expert system.

FIG. 1 illustrates one implementation of components of an expert system for providing advice on the efficacy of software development practices used on software development endeavors. In the illustrated implementation, the expert system comprises a model and software running in a computing environment including an expert system client computing environment 100, an expert system server computing environment 110, an expert system storage computing environment 120 and an expert system knowledge base storage computing environment 130. As will be described below, various forms and configurations of the computing environment can be used including personal computers, laptops and web servers.

Figure 2:
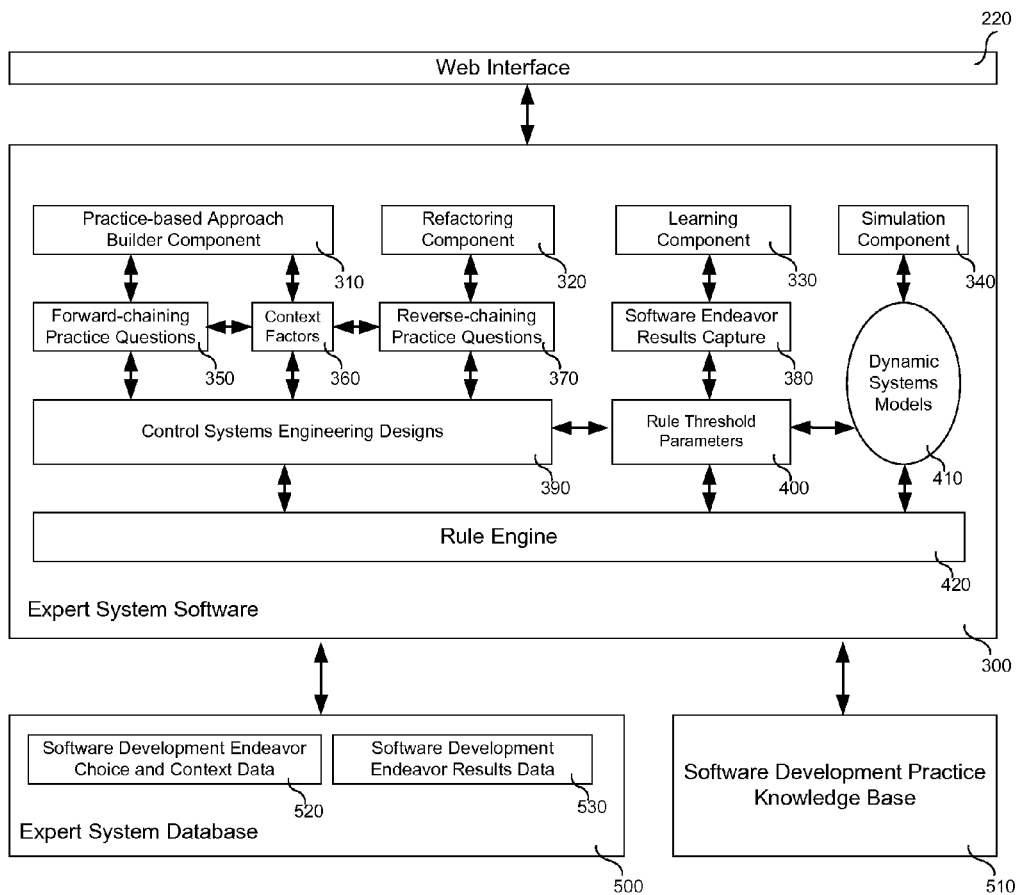
FIG. 2 illustrates one implementation of an expert system enabled to utilize Dynamic Systems Models and Control Systems Engineering Designs; and, FIG. 3 is a flow chart illustrating a method for producing software development practice advice in the expert system of FIG. 2; and, FIG. 4 is a flow chart illustrating a method for refactoring and improving software development practice advice in the expert system of FIG. 2.

FIG. 1 also illustrates the web browser 210 operating within the expert system client computing environment 100 communicating over a network with the expert system server computing environment 110 through the web interface 220. While only one web browser is illustrated in FIG. 1, in various implementations the web interface can be configured such that it can communicate with more than one web browser simultaneously. The web interface 220 allows a user to access the various expert system components contained within expert system software 300 as are illustrated in FIG. 2 and will be described below. These components include a practice-based approach builder component 310; a refactoring component 320 which provides advice on how to improve software endeavor results including but not limited to practice alternatives to fix current challenges and materialized risks; a learning component 330 which enables capture of result data for user, organizational and industry learning about actual usage of practices on software development endeavors; and a simulation component 340 which enables what-if analysis of practice-set configurations on project results. In various implementations, the web interface 220 can supply information and control capabilities through the web browser 210 via technologies including, but not limited to: client-side Javascript, server-side Javascript, Java, SERVLET, JSP, PERL, PYTHON, PHP, ASP, .NET, J2EE, STRUTS, SPRING, PICO, RUBY ON RAILS, AJAX, DOJO, CSS, and XSL.

In one implementation, each of these components uses the functionality and data of the expert system database 500 running in an expert system storage computing environment 120; and the software development practice knowledge base running in a knowledge base storage computing environment 130. In various implementations, communication between the expert system components running in the expert system server computing environment 110 can access information and control capabilities of the storage computing environment components running within 120 and 130 via technologies including but not limited to SOAP, REST, JAX-WS, HIBERNATE, HQL, SQL, JQUERY, JDBC, ODBC, XMI, XSLT and Cloud.

FIG. 2 illustrates the practice-based approach builder component 310 interacting with the forward-chaining practice questions 350 after context factors 360 are captured for an endeavor, each structured around the knowledge contained within Control Systems Engineering designs 390. Examples of designs leveraged within 390 include but are not limited to Proportional-Integral-Derivative Control, Adaptive Control, Cascade Control, Non-linear Control, Optimal Control and Stochastic Control. Context factors include but are not limited to size, geographical distribution, technical complexity, domain complexity, enterprise specialization, compliance requirements, contractual relationships, criticality and time-to-market pressures.

In one implementation, an inference-based rule engine 420 leverages rule threshold parameters 400 that are designed to filter context factors and their likely implications on practice choices. The rule threshold parameters 400 are derived from Dynamic Systems models 410. In various implementations, advice is presented through the web interface 220 to the web browser 210 such that a user can either accept risks presented related to the practices chosen, or can mitigate the risks by accepting the advice given and the substitute practices presented. Once complete, the set of practice choices selected and context factor data 520 can be stored in the expert system database 500.

FIG. 2 also illustrates the interaction of the expert system software 300 and a software development practices knowledge base 510. In one implementation practice-based knowledge is stored for retrieval composition and presentation based on stored practices choices 520 whereby the integration of practices into an approach or method is achieved through the aspect-oriented tangling into workflow models and associated practice technique guidance based on Control Systems Engineering designs component 390. Such practice knowledge can be dynamically generated and presented to a user through web interface 220 to the web browser 210. Storage for presentation can leverage common process/practice management facilities within industry including but not limited to Software Process Engineering Meta-model (SPEM) 2.0 based tools such as Eclipse Process Framework (EPF) Composer or IBM Rational Method Composer.

As illustrated in the implementation of FIG. 2, the expert system leverages a refactoring component 320 interacting with the reverse-chaining practice questions 370 to identify root causes for symptomatic concerns being experience during actual execution of prior practice choices from 520. In one possible embodiment of this invention, calculation of likely root causes is derived from Control System Engineering designs 390 and from Dynamic Systems models 410 through the application of rule threshold parameters 400 leveraged by a rule engine 420. Advice is given on likely practices that can alleviate adverse conditions on the software development endeavor, with changes to practices if accepted stored in the expert system database 500 for future causal analysis. This data is used for improving advice given by the expert system software 300 by modifying rule threshold parameters 400. Efficacy data can be presented through the learning component 330 as shown in FIG. 2 at both an individual software development endeavor scope or in aggregated formats at organizational scope or macroscopically at an industry-wide scope. In one possible implementation, successful practice usage data 380 can be captured using the learning component 330 to complete analysis possible for learning about the efficacy of software development practices for various combinations context factors. Such learning capability could be used either retroactively or proactively in relation to making practice choices that make up a software development approach.

FIG. 2. also illustrates one implementation of the expert system including a simulation component 340 interacting with the Dynamic Systems models 410. Such simulations execute within the expert system software 300, with the user able to control parameters of these models to illustrate through the web browser via a web interface 220 likely effects of various practice choices on an overall socio-technical system made up of the set of choices. Examples of such Dynamic Systems models include but are not limited to Transfer Functions, Bode Plots, Root Locus charts, pole placements, Nichols Plots and State-space matrices.

Figure 3:
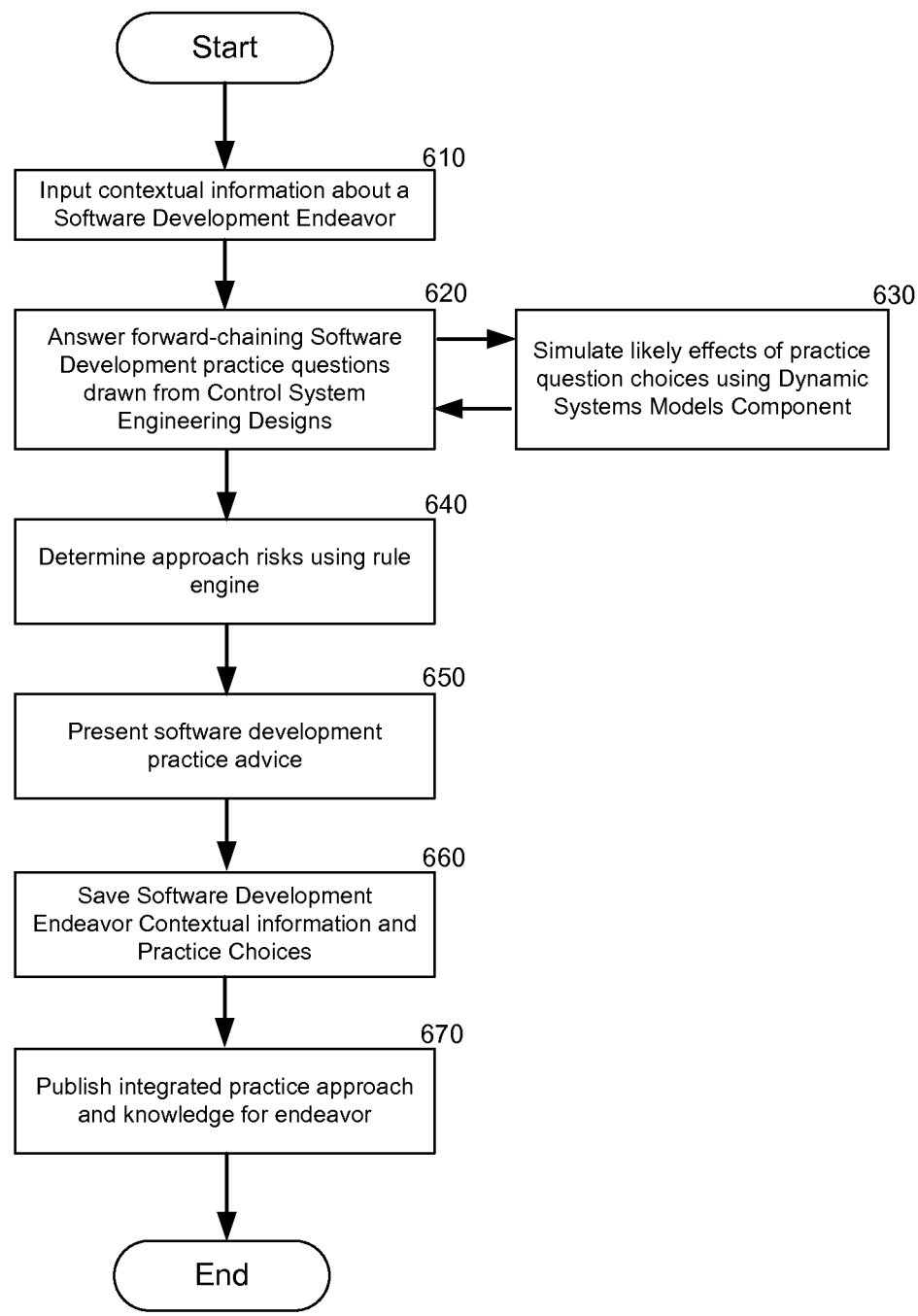

FIG. 3 illustrates one implementation of a method for using an expert system for assembling and representing a practice-based approach to software development and providing advice on the efficacy of software development practices. The process begins at block 610, where contextual information about the software development endeavor in input by a user. In one implementation, selection of context factors is performed through a web interface for data values stored in a database. Next, at block 620, a user answers forward-chaining questions regarding software development practice choices. Such questions are can be driven from Control System Engineering designs. If chosen by a user, one possible implementation allows for a user to simulate choices at block 630 before committing to following the advice and guidance provided by the set of practices. Next, at block 640, the expert system determines approach risks using in one implementation an inference-based rule engine. Next, in block 650, advice is presented to the user allowing for acceptance of changes suggested or acceptance of approach risks. In block 660, the set of choices and associated contextual factors are saved in a database in one embodiment. Then in block 670, one implementation of the expert system processes the set of practices, using the Control System Engineering designs to tangle the aspectual-based practices into workflow models and practice guidance presented to the user through a web interface or possibly in document or report form.

Figure 4:
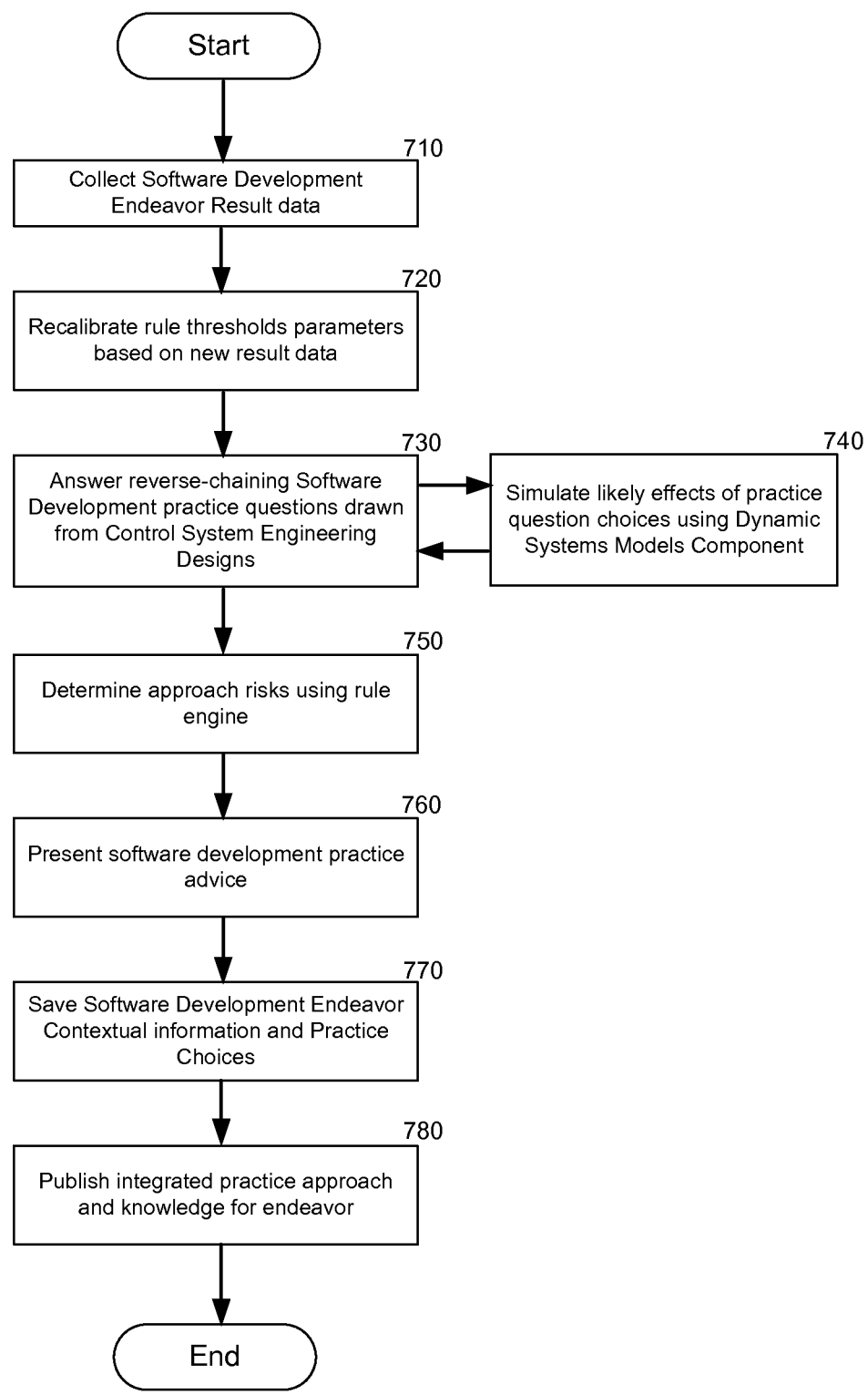

FIG. 4 illustrates one implementation of a method for using an expert system for learning and refactoring a practice-based approach to software development. The process begins at block 710 where software development result data is collected, including progress data, judgments about the efficacy of practices. In one embodiment, such data is input through a web browser 220 providing the learning component 330 functionality. Next, in block 720, the rule threshold parameters are re-calibrated based on newly submitted software development endeavor result data. Results of this data capture can be visualized through various charts and reports contained within the learning component. Next in block 730, the user can answer reverse-chaining software development practice questions driven by Control Systems Engineering designs. In one possible embodiment, such questions can drive towards root causes behind symptomatic observations manifesting such techniques as 5-why's. If chosen by a user, one possible implementation allows for a user to simulate choices at block 740 before committing to following the advice and guidance provided by the set of re-factored practices. Next in block 750, approach risks are determined from practice choices using an inference-based rule engine as one implementation. Next, in block 760, advice is presented to the user allowing for acceptance of changes suggested or acceptance of approach risks. In block 770, the set of choices and associated contextual factors are stored in a database in one embodiment. Then in block 780, one implementation of the expert system processes the set of practices, using the Control System Engineering designs to tangle the aspectual-based practices into workflow models and practice guidance presented to the user through a web interface.

The above embodiments of the invention can take the form of computing environments made entirely of hardware or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of the above description, examples of a computer-readable medium include a semiconductor or solid state memory, removable flash memory, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computing environment suitable for storing and/or executing program code and data for blocks 100, 110, 120 and 130 will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, touch-screens etc.) can be coupled to the system either directly or through intervening I/O controllers. Network adapters may also be coupled to the system to enable the computing environment to become coupled to other computing environment or storage devices through intervening private or public networks. Modems, cable modem and Ethernet cards are just a few of the currently available types of network adapters.

I claim:

1. A system consisting of a computer processor, computer memory, and computer storage capable of executing computer usable program code which when executed implements a method for providing expert advice regarding the effective usage of software development methods or approaches, the software development methods or approaches consisting of a plurality of software development practices, the system comprising:

a plurality of control system engineering designs configured to structure the composition of software development practices into a socio-technical system of practices representing a software development approach;

and a plurality of dynamic systems models configured to model expected software development results and the effects of software development practice choices on socio-technical system dynamics;

wherein a software development practice is defined as a tactic or technique performing a function within a software development project or endeavor directed towards achieving an effective overall outcome, the tactic or technique representing a logical aspect of the software development project or endeavor which when combined are tangled into a software development method representative of the socio-technical system, the socio-technical system being comprised of both human and technology components;

wherein a control system engineering design is defined as a set of components which includes:

a reference signal or setpoint representative of requirements or intent capture software development practices of the software development project or endeavor;

a plant being controlled, the plant in the case of software development being a team of individuals performing work using tools to create software;

an inner negative feedback loop among various pairs or combinations of individuals representing collaborative software development practices and representing a cascade control design configuration;

a feedback sensor in the form of software testing, review and demonstration software development practices;

a comparator implementing an outer negative feedback loop which compares output results from the feedback sensor and a time varying reference signal or setpoint, the comparison being achieved by comparison and evaluation software development practices;

and a controller influencing a dynamic response of the plant using a difference evaluated by the comparator, an influence being applied to the plant in the form of proportional type software development practices, derivative type software development practices based on the rate of change of the comparator difference, or integral type software development practices based on a summation of past comparator difference.

2. The system of claim 1, wherein the control system engineering designs are configured to include at least one of the following:

Proportional-Integral-Derivative control designs, Adaptive control designs, Cascade control designs, Non-linear control designs, and Optimal control designs.

3. The system of claim 1, wherein one of the dynamic system models are configured to include at least one of the following:

Bode models, Root-locus models, Transfer function models, Differential equation models, Nyquist models, Nichols models, State-space matrix models.

4. The system of claim 1, further comprising a rule engine containing a plurality of forward-chaining and reverse-chaining inference rules.

5. The system of claim 1, further comprising a database containing software development practice choices, software development endeavor contextual factors and software development endeavor results, with contextual factors to include at least one of the following:

size, geographical distribution, domain complexity, technical complexity, enterprise specialization, compliance requirements, contractual requirements, criticality, time-to-market requirements, organizational culture.

6. The system of claim 1, further comprising a knowledge base containing software development practice and risk knowledge.

7. The system of claim 4, wherein the plurality of forward-chaining and reverse-chaining inference rules are structured using control engineering designs.

8. The system of claim 4, wherein rules comprised within a rule engine are re-calibrated based on software development endeavor results.

9. The system of claim 6, wherein any set of practices can be integrated and tangled into a description and workflow model of a software development approach or method using aspect-orientation.

10. The system of claim 1, further comprising a web interface module and web browser configured to facilitate selection of software development practices for a software development endeavor by a user, specification of contextual factors for a software development endeavor by a user, input of software development endeavor results by a user, and modification of prior practice selections for a software development endeavor by a user.

11. The system of claim 10 wherein practice selections for a software development endeavor, contextual factors for a software development endeavor, practice selection risks for a software development endeavor, advice, and software development practice knowledge are presented to a user.

12. The system of claim 10 wherein the web interface module and web browser is further configured to modify dynamic systems models through practice selections context factors and present advice and provide simulation information to a user.

13. The system of claim 10 wherein the web interface module and web browser is further configured to present software development endeavor result information and practice efficacy information for visualization on a per-project, per-organization; or industry-wide scope.

14. A plurality of computing environments, the computing environments comprising non-transitory computer-readable media, the non-transitory computer-readable media providing expert advice regarding the effective usage of software development methods or approaches, the software development methods or approaches consisting of a plurality of software development practices, the non-transitory computer-readable media comprising:

a plurality of control system engineering designs configured to structure the composition of software development practices into a socio-technical system of practices representing a software development approach;

and a plurality of dynamic systems models configured to model expected software development results and the effects of software development practice choices on socio-technical system dynamics;

wherein a software development practice is defined as a tactic or technique performing a function within a software development project or endeavor directed towards achieving an effective overall outcome, the tactic or technique representing a logical aspect of the software development project or endeavor which when combined are tangled into a software development method representative of the socio-technical system, the socio-technical system being comprised of both human and technology components;

wherein a control system engineering design is defined as a set of components which includes:

a reference signal or setpoint representative of requirements or intent capture software development practices of the software development project or endeavor;

a plant being controlled, the plant in the case of software development being a team of individuals performing work using tools to create software;

an inner negative feedback loop among various pairs or combinations of individuals representing collaborative software development practices and representing a cascade control design configuration;

a feedback sensor in the form of software testing, review and demonstration software development practices;

a comparator implementing an outer negative feedback loop which compares output results from the feedback sensor and a time varying reference signal or setpoint, the comparison being achieved by comparison and evaluation software development practices;

and a controller influencing a dynamic response of the plant using a difference evaluated by the comparator, an influence being applied to the plant in the form of proportional type software development practices, derivative type software development practices based on the rate of change of the comparator difference, or integral type software development practices based on a summation of past comparator difference.

15. A method for providing expert advice regarding the effective usage of software development methods or approaches, the software development methods or approaches consisting of a plurality of software development practices, the method comprising:

structuring the composition of software development practices into a socio-technical system of practices representing a software development approach or method using a plurality of control system engineering designs;

and modeling expected software development results and the effects of software development practice choices on socio-technical system dynamics using a plurality of dynamic systems models;

wherein a software development practice is defined as a tactic or technique performing a function within a software development project or endeavor directed towards achieving an effective overall outcome, the tactic or technique representing a logical aspect of the software development project or endeavor which when combined are tangled into a software development method representative of the socio-technical system, the socio-technical system being comprised of both human and technology components;

wherein a control system engineering design is defined as a set of components which includes:

a reference signal or setpoint representative of requirements or intent capture software development practices of the software development project or endeavor;

a plant being controlled, the plant in the case of software development being a team of individuals performing work using tools to create software;

an inner negative feedback loop among various pairs or combinations of individuals representing collaborative software development practices and representing a cascade control design configuration;

a feedback sensor in the form of software testing, review and demonstration software development practices;

a comparator implementing an outer negative feedback loop which compares output results from the feedback sensor and a time varying reference signal or setpoint, the comparison being achieved by comparison and evaluation software development practices;

and a controller influencing a dynamic response of the plant using a difference evaluated by the comparator, an influence being applied to the plant in the form of proportional type software development practices, derivative type software development practices based on the rate of change of the comparator difference, or integral type software development practices based on a summation of past comparator difference.

16. The method of claim 15, wherein the control system engineering designs are configured to include at least one of the following:

Proportional-Integral-Derivative control designs, Adaptive control designs, Cascade control designs, Stochastic control designs, Non-linear control designs, and Optimal control designs.

17. The method of claim 15, wherein one of the dynamic system models are configured to include at least one of the following:

Bode models, Root-locus models, Transfer function models, Differential equation models, Nyquist models, Nichols models, State-space matrix models.

18. A method for integrating software development practices into a software development method or approach using aspect-orientation, the resultant software development method or approach representing a socio-technical system, the method comprising:

scattering the plurality of software development methods into of software development dynamics systems models; and tangling the plurality of software development practices into a socio-technical system of practices representing a software development approach using control system engineering designs.

\* \* \* \* \*